ical Patent [19]

Smith et al.

[11] Patent Number: 4,576,821

[45] Date of Patent: Mar. 18, 1986

[54] LONG LIFE SEMI-ARTIFICIAL BAIT

[75] Inventors: Malcolm S. Smith, Beaumont; Colastie J. Daigle, Orange, both of Tex.

[73] Assignee: E. I. Du Pont de Nemours and Company, Wilmington, Del.

[21] Appl. No.: 754,156

[22] Filed: Jul. 12, 1985

[51] Int. Cl.[4] ............... A23L 1/325; A01K 85/00
[52] U.S. Cl. ................................ 426/1; 43/44.99
[58] Field of Search .................. 426/1; 43/44.99; 523/102

[56] References Cited

U.S. PATENT DOCUMENTS 1,185,894  6/1916  Evans .................................. 426/1
4,202,905  5/1980  Asai et al. ........................... 426/1

Primary Examiner—George Yeung

[57] ABSTRACT

Fish and crustacean bait consisting essentially of (a) from about 5 to about 50 wt. % of a water insoluble polymer having a melting point below about 110° C. (e.g., polyamides and copolymers of ethylene with at least one ethylenically unsaturated comonomer); (b) from about 45 to about 95 wt. % of fish meal; and (c) from 0 to about 20 wt. % of fish oil.

18 Claims, No Drawings

LONG LIFE SEMI-ARTIFICIAL BAIT

BACKGROUND OF THE INVENTION

This invention relates to crustacean bait and more particularly it relates to long life semi-artificial bait containing polymer, fish meal and optionally fish oil.

DESCRIPTION OF THE PRIOR ART

Crustacea (crawfish, crabs and lobsters) are normally harvested by means of a wire trap baited with an attractant—fish, fish meal, fish oil, animal slaughterhouse products, dried milk, eggs, etc. The trap is normally run on a daily basis during which the crustacea are removed, the trap rebaited and the trap reset.

The two major types of bait used to catch crawfish are semiartificial and fish. Semiartificial baits are a blend of natural fillers, fish meal and fish oil, held together with a water soluble paste. Baits of this type disappear after 12-24 hours in the trap and must be replenished daily. The use of fish as a bait for crawfish is declining because of the overall cost and quality variability of fish. Both fish and semiartificial baits are expensive and represent a significant expense in the harvesting of crawfish. They are difficult to store and have a short shelf life under ambient conditions. A need exists for a long life semiartificial bait (1) capable of catching crawfish over an extended period of time without rebaiting, and (2) with a reasonable ambient storage life.

U.S. Pat. No. 3,410,689 discloses fish or crustacean bait formed of a plastic foam, e.g. polyurethane foam, having a fish attractant integrally mixed within the solid plastic structure. The patentee expressly distinguishes his bait from one made by suspending a substance within the interstices of a porous object such as a foamed plastic or sponge. The bait is disclosed to be manufactured by well known conventional methods for forming foam plastics such as admixing two reactants which polymerize and yield a gaseous product which affects the foam structure. A third ingredient, the fish attractant, is mixed with one or both of the conventional reactants prior to the chemical reaction or polymerization. Fish attractants disclosed are "dehydrated fish meal, fish oil, dry slaughterhouse waste products, powdered fish, egg, dried milk products, molasses, . . . ". The bait is formed so as to break up into small particles in water which dispense into the water and are carried away by the natural flow of water.

U.S. Pat. No. 3,684,519 describes a bait of finely ground organic tissue particles in polyacrylamide gel. In water this gel swells and allows the odor of the attractant to be released. The bait is disclosed to be useful especially for crab fishing in crab pots. This type of bait permits storage without refrigeration. Acrylamide gel was used because of its compatability with protein. In water the gel swells, the tissue decays to give off odor, but is still physically protected. The organic tissue is finally ground, for example, in a blender, is mixed into the gel solution and is gelled at room temperature. The acrylamide "reforms the cell walls of the tissue". Prolonged exposure to open air will cause dehydration of the gel. However, the bait can remain immersed in fresh water for one month and still remain attractive to crabs. More rapid degradation occurs in salt water but is still good for 48 hours versus 5 hours for fresh bait. The gel is distasteful to crabs so it is not eaten, the crabs spit it out.

U.S. Pat. No. 3,875,302 discloses bait made from aqueous gels of polyvinyl alcohol. The bait is made by freezing, melting and refreezing the aqueous PVA. Freezing determines the micellar structure, elasticity, and water resistance. Fish oil is used as a non-solvent to make the PVA assume a globular form. The composition is disclosed to be suitable as carriers for bait, fertilizer, etc. or used as bait by addition of attractant, for example, fish powder (30-200 wt. %). No degradation is reported in the water, however, it is highly swollen by the water. The odor continues for about 10 days. It can be used for bait in crab baskets. The composition consists of 100 parts of 10% aqueous solution of PVA, 15 parts of mackerel, 10 parts of clay, and 0.2 parts of dye. The texture of the bait is similar to that of natural bait.

European Patent Application No. 84306264.7, published on Apr. 17, 1985 (Publication No. 0137748) discloses an artificial bait for fish, which bait is capable of the prolonged release of an attractant for said fish into surrounding water. This artificial bait comprises (a) a polymeric material comprising a water-soluble cellulose ether or polyvinyl alcohol and a plasticizer therefore, said polymeric material having dispersed therein (b) an attractant for fish which attractant is capable of being released in active form from said polymeric material upon contacting the artificial bait with water.

The baits are disclosed to be suitable for all forms of fishing such as sport fishing, commercial fishing, ocean fishing and fresh water fishing, as well as for catching shell fish and crustaceans such as lobsters, crabs, shrimp and the like. Preferred attractants disclosed are liquified fish or other marine products, fish oils, anise, amino acids or synthetic attractants.

Natural baits, such as squid, shrimp, bunker, or waste fishes or fish parts normally disposed of in fishing operations, such as fish heads, shrimp heads, carcasses, trash fish, trash invertebrates and the like may all be employed to prepare attractant mixtures. Generally, greater than 40 percent attractant, based on weight of polymeric material, is disclosed to cause the bait to have poor physical properties. Thus, for shaped baits where physical strength is an important parameter, it is generally desirable to employ less than 40 percent attractant. Preferably, 5 to 40, more preferably 5 to 20 percent by weight attractant are employed per 100 percent polymeric material in a shaped bait. In other bait forms such as lobster bait, where physical strength is not important, somewhat higher levels of attractant may be employed if desired. In general, however, the bait will not contain more than 50 percent of attractant per 100 percent of polymeric material.

SUMMARY OF THE INVENTION

According to the present invention, there is provided a fish and crustacean bait consisting essentially of (a) from about 5 to about 50 wt. % of a water insoluble polymer having a melting point below about 110° C. selected from the group consisting of polyamides and copolymers of ethylene with from about 15 to about 45 wt. % of at least one ethylenically unsaturated comonomer;

(b) from about 45 to about 95 wt. % of attractant selected from the group consisting of fish meal and powdered fish; and (c) from 0 to about 20 wt. % of fish oil.

As used herein the term "consisting essentially of" means that the named ingredients are essentially; however, other ingredients that do not prevent the advantages of the present invention from being obtained can also be included.

DETAILED DESCRIPTION OF THE INVENTION

It has been found that the combination of certain polymers and fish meal and optionally fish oil, results in a long life semi-artificial bait suitable for catching crustacea and fish.

Suitable polymers have the common characteristics of being relatively soft, low melting, water insoluble and able to accept high filler loadings, such as fish meal and oil attractants while retaining satisfactory physical strength properties (perhaps due to their polar comonomer content). The polymer must be soft enough to permit the crustacea to "chew" on it, yet be strong enough to remain substantially intact over a sufficiently long period of time. Since the bait is best made by an extrusion process, the polymer must melt and be processable at a low enough temperature (about 90°–110° C.) such that the fish products will not be degraded during processing.

Thus suitable polymers are water insoluble polymers having a melting point below about 110° C. selected from the group consisting of polyamides and copolymers of ethylene with at least one ethylenically unsaturated comonomer. Examples of such polymers are ethylene/n-butyl acrylate/carbon monoxide (E/nBA/CO), ethylene/methacrylic acid (E/MAA), E/nBA/MAA, E/nBA/GMA (glycidyl methacrylate), E/MAA/VA (vinyl acetate), E/VA/CO, and E/iBA (i-butylacrylate)/MAA, and polyamides, such as "Macromelt" 6301 hot melt adhesive available from Hendel Corporation.

Generally the ethylenically unsaturated comonomer in the ethylene copolymer is present in an amount of from about 15 to about 45 weight percent. Increasing the amount of ethylenically unsaturated comonomers in a given ethylene copolymer increases copolymer melting point, decreases attractant solubility and increases blend hardness. A compromise of these properties is necessary in the various polymers to produce acceptable baits.

Preferably the ethylenically unsaturated comonomer is present in an amount of from about 20 to about 40 weight percent, and most preferably from about 25 to about 35 weight percent.

The most preferred ethylene copolymer is ethylene/vinyl acetate.

The amount of polymer in the bait of the present invention is from about 5 to about 50 weight percent, preferably from about 7.5 to 30 and most preferably from about 10 to about 15 weight percent.

The second essential ingredient is an attractant such as fish meal or powdered fish.

The amount of attractant, e.g. fish meal, in the bait of the present invention should be from about 45 to about 95 weight percent, preferably from about 70 to about 92.5 and most preferably from about 85 to about 90 weight percent.

Optionally fish oil can also be incorporated in the bait of the present invention. The amount of fish oil present can be from 0 to about 20 percent by weight, preferably from 0 to about 10 and most preferably from about 2 to about 7 weight percent.

The semi-artificial bait of the present invention is suitable for catching crab, lobster, and fish as well as crawfish.

The semi-artificial bait of the present invention has the advantages of (1) reduced bait cost because of the ability of the bait to catch crawfish for in excess of four days as compared to currently used commercial baits that need to be replaced daily; (2) reduced labor cost since the bait of the present invention allows the farmer to run his traps every two, three, four or even longer days rather than every day as is required with the currently used commercial baits; and (3) an ambient storage life in excess of one year.

The semi-artificial bait of the present invention and its optimum formulation is unique in its ability to catch crawfish for over a period of several days at a rate similar to the commercial baits currently in use which latter being water soluble must be replaced daily. The present invention bait is rendered insoluble by the polymer ingredient thereof resulting in an effective, useful life of several days.

A slow diffusion of attractant occurs which is accelerated by the feeding pressure of the crustacea on the bait. The optimum bait then becomes one that has the best catch rate, life, processability and economics.

The following examples serve to illustrate the present invention. All parts, percentages and proportions are by weight unless otherwise indicated.

EXAMPLES

Compositions of polymer, fishmeal, and optionally fish oil were dry blended by tumbling for about 15 minutes. This blend was fed to a 2½" (63.5 mm) diameter extruder in which the breaker plate and screen pack were removed. A rapid compression screw was used, with a 20.6/1 L/D ratio, 1041 mm in length with a 267 mm mixing torpedo on the end. Melt temperature was maintained around 90°–110° C. A typical temperature profile for a blend containing ethylene-vinyl acetate copolymer was:

| | |
|---|---|
| Zone 1 | 60° C. |
| Zone 2 | 77° C. |
| Zone 3 | 85° C. |
| Zone 4 | 90° C. |
| Melt temperature | 95° C. (by probe) |

The blend was extruded through a heated pipe, 30 cm long by 35 mm inside diameter (dimensions not critical) to produce a continuous rope. Rope lengths of about 13 cm were air cooled. Since the extruded rope was air cooled, melt temperature was maintained as low as possible, consistent with good extrusion.

The fishmeal was supplied by Zapata Haynie Corporation as a dry, homogeneous meal, or by Country Skillet Catfish Company (subsidiary of ConAgra Corporation) as a nonhomogeneous oily meal. The oily meal was used in all of the Examples except for Examples 2, 12–18, and 27 where the dry meal was used.

EXAMPLE 1

The mixing and extrusion temperature was varied to illustrate the effect of temperature on processing. A composition containing 15% EVA (33% VA, melt index 43), 80% fishmeal, and 5% fish oil was prepared. Extrusion at a melt temperature of 93° C. resulted in formation of excellent rope. Increasing the melt temperature to 126° C. resulted in gas forming in the melt which caused erratic rope production. Increasing the melt temperature to 150° C. caused severe gas buildup with uncontrollable extrusion.

COMPARATIVE EXAMPLE 1

An attempt was made to prepare a blend of 45% high density polyethylene (0.960 g/cm$^3$, M.I.=15) 50% fishmeal, and 5% fish oil. At temperatures of 110° C. and 135° C. the blend would not feed through the extruder.

EXAMPLES 2 to 12

Blends were prepared using a variety of ethylene copolymers, as shown in Table I. In all cases the blends could readily be prepared by extrusion at about 100° C., as described above. The compositions were tested for catching crawfish by placing about 100 g of the composition into a crawfish trap, and placing the trap on the bottom of a pond, at a depth of about 36 cm. Each day the trap was emptied and the weight of crawfish caught was determined. In some cases controls were run, which consisted of traps baited with commercial bait. The commercial baits were a blend of natural fillers, fish oil, and fishmeal held together with a water soluble paste. Since the commercial baits are water soluble, they disappear after 12-24 hours in the trap. Thus in every case the controls were rebaited daily, while a single dose of the experimental bait was left in the trap for the number of days indicated. In some cases controls were not run, but instead blanks were used, which consisted of empty traps. It was found that one or two crawfish (about 30-50 g) would normally be caught per day by a blank trap, at the time of these experiments.

EXAMPLES 16 to 28

Experimental baits containing varying amounts of EVA were prepared and tested as described in Examples 2 to 12. All the blends tested caught crawfish. The catch, although variable, seemed to be optimal with compositions of less than about 30% polymer. Results are summarized in Table III.

TABLE III

| Example | EVA type[a] | Polymer % | Oil % | Meal % | Catch per day (g) sample | Catch per day (g) Control | duration (days) |
|---|---|---|---|---|---|---|---|
| 16 | A | 7.5 | 2.5 | 90 | 140 | 150 | 7 |
| 17 | A | 7.5 | 10 | 82.5 | 90 | 70 | 2 |
| 18 | A | 7.5 | 15 | 77.5 | 230 | 60 | 1 |
| 19 | A | 10 | 2.5 | 87.5 | 150 | 150 | 7 |
| 20 | B | 10 | 0 | 90 | 510 | 590 | >4 |
| 21 | B | 15 | 0 | 85 | 480 | 590 | >4 |
| 4 | B | 20 | 15 | 65 | 280 | 360 | >2 |
| 22 | B | 20 | 0 | 80 | 100 | 320 | >2 |
| 23 | B | 25 | 15 | 60 | 150 | 360 | >2 |
| 2 | C | 25 | 15 | 60 | 450 | 520 | >2 |
| 24 | B | 30 | 10 | 60 | 140 | 520 | >2 |
| 25 | C | 30 | 10 | 60 | 140 | 520 | >2 |
| 26 | C | 30 | 10 | 60 | 34 | 570 | >2 |
| 27 | C | 45 | 15 | 40 | 150 | 570 | >2 |
| 28 | A | 50 | 5 | 45 | Not tested | | |

[a]A = 33% VA, 43 MI
B = 40% VA, 57 MI
C = 28% VA, 400 MI

Several experiments from Examples 2 to 12 and 16 to 28 are reported in more detail in Table IV. The data shows that the experimental bait continued to catch crawfish over a seven day period without rebaiting.

TABLE I

| Example | Polymer Composition, %[a] E | VA | nBA | iBA | CO | MAA | GMA | Melt Index | Polymer % | Oil % | Meal % | Catch per day (g) sample | control | duration |
|---|---|---|---|---|---|---|---|---|---|---|---|---|---|---|
| 2 | 72 | 28 | | | | | | 400 | 25 | 15 | 60 | 450 | 520 | >2 |
| 3 | 67 | 33 | | | | | | 43 | 15 | 5 | 80 | 170 | 150 | 7 |
| 4 | 60 | 40 | | | | | | 57 | 20 | 15 | 65 | 280 | 360 | >2 |
| 5 | (50% polymer of Ex. 2 + 50% polymer of Ex. 4) | | | | | | | | 25 | 15 | 60 | 120 | 360 | >2 |
| 6 | 60 | | 30 | 10 | | | | 5.0 | 20 | 0 | 80 | 140 | — | >4 |
| 7 | 67.6 | | 24 | | 8.4 | | | 25 | 20 | 0 | 80 | 100 | — | >4 |
| 8 | 67 | | 27 | | | | 6 | 9.0 | 20 | 0 | 80 | 70 | — | >4 |
| 9 | 80 | | | 10 | 10 | | | 35 | 20 | 0 | 80 | 150 | — | >4 |
| 10 | 66 | 24 | | 10 | | | | 35 | 20 | 0 | 80 | 80 | — | >4 |
| 11 | 85 | | | | | 15 | | 60 | 20 | 0 | 80 | 240 | — | >4 |
| 12 | 74 | 25 | | | | 1 | | 500 | 20 | 0 | 80 | 330 | — | >4 |

[a]E = ethylene; VA = vinyl acetate; nBA = nbutyl acrylate; iBA = isobutyl acrylate; CO = carbon monoxide; MAA = methacrylic acid; GMA = glycidyl methacrylate

EXAMPLES 13 to 15

It was found that low molecular weight thermoplastic polyamide capable of being extruded to form a homogeneous melt at a melt temperature below about 121° C. could be used as the polymer portion of the blend, either alone or in combination with an EVA resin. The compositions listed in Table II were prepared as described above, and extruded to form good rope.

TABLE II

| Example | EVA[a] % | Polyamide % | Oil % | Meal % |
|---|---|---|---|---|
| 13 | 12.5 | 2.5 | 5 | 80 |
| 14 | 7.5 | 5 | 5 | 82.5 |
| 15 | 0 | 7.5 | 5 | 87.5 |

[a]33% VA, 43 M.I.

The control was a trap which was rebaited daily with commercial bait.

TABLE IV

| Example | Catch in (g) on day # 1 | 2 | 3 | 4 | 5 | 6 | 7 |
|---|---|---|---|---|---|---|---|
| 3 | 180 | 180 | 190 | 250 | 190 | 110 | 60 |
| 16 | 170 | 200 | 140 | 110 | 100 | 120 | 80 |
| 19 | 180 | 110 | 190 | 200 | 160 | 60 | 130 |
| Control | 280 | 190 | 170 | 130 | 100 | 100 | 90 |

EXAMPLE 29 AND COMPARATIVE EXAMPLE 2

Experiments were run as in Example 2 to 12, varying the amount of oil in the blends as shown in Table V. About 0-15% oil gave the best results. Use of oil alone in the absence of meal was not particularly effective. It was also found that addition of small aounts of fish oil to the dry, homogeneous meal (Zapata) made for easier processing, whereas addition of oil to the oilier meal (ConAgra) was not particularly important.

TABLE V

| Example | EVA type | Polymer % | Oil % | Meal % | Catch per day (g) sample | Catch per day (g) Control | duration (days) |
| --- | --- | --- | --- | --- | --- | --- | --- |
| 21 | B | 15 | 0 | 85 | 480 | 590 | >4 |
| 19 | A | 10 | 2.5 | 87.5 | 150 | 150 | 7 |
| 3 | A | 15 | 5 | 80 | 170 | 150 | 7 |
| 17 | A | 7.5 | 10 | 82.5 | 90 | 70 | 2 |
| 4 | B | 20 | 15 | 65 | 280 | 360 | >2 |
| 29 | A | 20 | 15 | 65 | 210 | 640 | >2 |
| C-2 | C | 50 | 50 | 0 | 10–30 | 230 | >4 |

COMPARATIVE EXAMPLE 3

Experiments were run as in Examples 2 to 12. The effect of varying the amount of fishmeal in the blends, is shown in Table VI. Use of about 60–90% fishmeal gave the best results.

TABLE VI

| Example | EVA type | Polymer % | Oil % | Meal % | Catch per day (g) sample | Catch per day (g) Control | duration (days) |
| --- | --- | --- | --- | --- | --- | --- | --- |
| C-2 | C | 50 | 50 | 0 | 10–30 | 230 | >4 |
| C-3 | C | 40 | 60 | 0 | 10–30 | 230 | >4 |
| 28 | A | 50 | 5 | 45 | | not tested | |
| 2 | C | 25 | 15 | 60 | 450 | 520 | >2 |
| 4 | B | 20 | 15 | 65 | 280 | 360 | >2 |
| 18 | A | 7.5 | 15 | 77.5 | 230 | 60 | 1 |
| 3 | A | 15 | 5 | 80 | 170 | 150 | 7 |
| 17 | A | 7.5 | 10 | 82.5 | 90 | 70 | 2 |
| 21 | B | 15 | 0 | 85 | 480 | 590 | >4 |
| 19 | A | 10 | 2.5 | 87.5 | 150 | 150 | 7 |
| 16 | A | 7.5 | 1.5 | 90 | 140 | 150 | 7 |

EXAMPLE 30

In order to evaluate the durability of the blends of the present invention, about 100 g of each of the following blends was placed in 3 liters of water and observed over a 10 day period: blend of Examples 3, 6, 7, 8, 9, 10, 11, and 19. Each of these blends exhibited the same behavior:

After 1 Day—Blend in one piece, slight evidence of product dissolving by off color of water.
After 3 Days—No, or little change.
After 4 Days—Small amount of floating material, water slightly to heavy in cloudiness. Odor developing with time.
After 7 Days—Blend in one piece. Water phase is cloudy. Odor.
After 10 Days—No change.

As a control, a portion of commercial bait ("Purina Crawfish Bait") was tested in the same fashion, with the following results:

After 1 Day—Bait is broken up, no longer one piece, dissolved layer (rust color) on bottom.
After 2 Days—Two fractions, dissolved and insoluble. Insoluble fraction (part floating, part on bottom).
After 3 Days—Solid layer on bottom, water is off color due to dissolved portion, floating portion.
After 7 Days—No change.
After 8 Days—Two distinct areas—bottom material (insoluble) and soluble material. Mold growing on surface—odor.
After 10 Days—No change.

The above results indicate that the experimental bait is markedly more durable in water than commercial bait.

EXAMPLE 31

Commercially available crawfish baits (e.g., "Purina Crawfish Bait") are packaged in 50 lb. bags. These products are less desirable as bait after one to three months ambient storage due to the presence of weevils which hatch from the stored product.

Polymer based long life semiartificial bait of the type described in Example 3 was packaged in a 50 lb. bag and stored at ambient conditions for one year. The product showed no evidence of weevils. It was compared to a fresh commercial control (baited daily) and a freshly prepared Example 3 blend.

TABLE VII

| Example | Bait | Catch in (g) on day # 1 | 2 | 3 |
| --- | --- | --- | --- | --- |
| 31 | Blend of Ex. 3 aged | 795 | 998 | 795 |
| | Blend of Ex. 3 fresh | 1040 | 1316 | 965 |
| | Commercial control, fresh | 431 | 537 | 832 |
| | Blank | 35 | 45 | — |

We claim:

1. Fish and crustacean bait consisting essentially of
   (a) from about 5 to about 50 wt. % of a water insoluble polymer having a melting point below about 110° C. selected from the group consisting of polyamides and copolymers of ethylene with from about 15 to about 45 wt. % of at least one ethylenically unsaturated comonomer;
   (b) from about 45 to about 95 wt. % of attractant selected from the group consisting of fish meal, and powdered fish; and
   (c) from 0 to about 20 wt. % of fish oil.

2. The bait of claim 1 wherein the polymer is a copolymer of ethylene selected from the group consisting of ethylene/vinyl acetate, ethylene/n-butyl acrylate/carbon monoxide, ethylene/n-butyl acrylate/methacrylic acid, ethylene/n-butyl acrylate/glycidyl methacrylate, ethylene/methacrylic acid/vinyl acetate, ethylene/methacrylic acid, ethylene/i-butylacrylate/methacrylic acid, and ethylene/vinyl acetate/carbon monoxide.

3. The bait of claim 2 wherein the comonomer in the ethylene copolymer is present in an amount of from about 20 to about 40 wt. %.

4. The bait of claim 1 wherein the polymer is present in an amount of from about 7.5 to about 30 wt. %.

5. The bait of claim 1 wherein the fish meal is present in an amount of from about 70 to about 92.5 wt. %.

6. The bait of claim 1 wherein the fish oil is present in an amount of from 0 to about 10 wt. %.

7. The bait of claim 2 wherein the polymer is ethylene/vinyl acetate.

8. The bait of claim 1 wherein the polymer is polyamide.

9. The bait of claim 8 wherein the polymer is present in an amount of from about 7.5 to about 30 wt. %; the fish meal is present in an amount of from about 70 to about 92.5 wt. %; and the fish oil is present in an amount of from 0 to about 10 wt. %.

10. The bait of claim 3 wherein the copolymer is present in an amount of from about 7.5 to about 30 wt. %; the fish meal is present in an amount of from about 70 to about 92.5 wt. %; and the fish oil is present in an amount of from 0 to about 10 wt. %.

11. The bait of claim 2 wherein the comonomer in the ethylene copolymer is present in an amount of from about 25 to about 35 wt. %.

12. The bait of claim 1 wherein the polymer is present in an amount of from about 10 to about 15 wt. %.

13. The bait of claim 1 wherein the fish meal is present in an amount of from about 85 to about 90 wt. %.

14. The bait of claim 1 wherein the fish oil is present in an amount of from about 2 to about 7 wt. %.

15. The bait of claim 8 wherein the polymer is present in an amount of from about 10 to about 15 wt. %; the fish meal is present in an amount of from about 85 to about 90 wt. %; and the fish oil is present in an amount of from 2 to about 7 wt. %.

16. The bait of claim 11 wherein the copolymer is present in an amount of from about 10 to about 15 wt. %; the fish meal is present in an amount of from about 85 to about 90 wt. %; and the fish oil is present in an amount of from 2 to about 7 wt. %.

17. The bait of claim 10 wherein the copolymer is ethylene/vinyl acetate.

18. The bait of claim 16 wherein the copolymer is ethylene/vinyl acetate.

* * * * *